US006527959B1

(12) United States Patent
Quadir et al.

(10) Patent No.: US 6,527,959 B1
(45) Date of Patent: Mar. 4, 2003

(54) METHOD OF CLARIFYING BAYER PROCESS LIQUORS USING SALICYLIC ACID CONTAINING POLYMERS

(75) Inventors: Murat Quadir, Naperville, IL (US);
Everett C. Phillips, Batavia, IL (US);
Larry E. Brammer, Jr., Aurora, IL (US); Robert P. Mahoney, Newbury, MA (US); John D Kildea, Mandurah (AU); Manian Ramesh, Lisle, IL (US);
John T. Malito, Oswego, IL (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 09/771,844

(22) Filed: Jan. 29, 2001

(51) Int. Cl.⁷ .................................................. B01D 21/01
(52) U.S. Cl. ...................... 210/727; 210/728; 210/730; 210/731; 210/734; 210/735; 423/121; 423/122
(58) Field of Search .................................. 210/725, 727, 210/728, 731, 732–736, 730; 423/121, 122

(56) References Cited

U.S. PATENT DOCUMENTS

| 3,390,959 | A |   | 7/1968  | Sibert          | 210/733 |
|-----------|---|---|---------|-----------------|---------|
| 4,169,824 | A |   | 10/1979 | Kane            | 423/111 |
| 4,545,902 | A |   | 10/1985 | Connelly et al. | 210/734 |
| 4,678,585 | A |   | 7/1987  | Brownrigg       | 210/727 |
| 4,767,540 | A |   | 8/1988  | Spitzer et al.  | 210/728 |
| 5,217,620 | A |   | 6/1993  | Mahoney et al.  | 210/728 |
| 5,286,391 | A |   | 2/1994  | Malito et al.   | 210/733 |
| 5,696,228 | A |   | 12/1997 | Coville         | 528/501 |
| 5,829,527 | A | * | 11/1998 | Ahmed et al.    | 166/295 |
| 6,036,869 | A |   | 3/2000  | Selvarajan et al.| 210/733 |
| 6,048,463 | A |   | 4/2000  | Selvarajan et al.| 210/727 |
| 6,086,771 | A |   | 7/2000  | Selvarajan et al.| 210/701 |
| 6,187,853 | B1| * | 2/2001  | Takeda et al.   | 524/457 |

* cited by examiner

*Primary Examiner*—Peter A. Hruskoci
(74) *Attorney, Agent, or Firm*—Michael B. Martin; Thomas M. Breininger

(57) ABSTRACT

A method of flocculating suspended solids in a Bayer process liquor comprising adding to the liquor an effective amount of a polymer comprising salicylic acid groups.

15 Claims, No Drawings

METHOD OF CLARIFYING BAYER PROCESS LIQUORS USING SALICYLIC ACID CONTAINING POLYMERS

TECHNICAL FIELD

This invention is directed to a method of clarifying Bayer process liquors using salicylic acid containing polymers.

BACKGROUND OF THE INVENTION

The Bayer process is almost universally used for the production of alumina from bauxite ore. The process involves pulverizing a bauxite ore, slurring it in caustic soda solution and digesting it at elevated temperatures and pressures. The caustic soda solution dissolves oxides of aluminum to form an aqueous sodium aluminate solution. The caustic-insoluble constituents of bauxite ore (referred to as "red mud") are then separated from the aqueous phase containing the dissolved sodium aluminate. This separation typically occurs through sedimentation, which is often aided by a flocculent, and filtration. Once separated, alumina trihydrate is precipitated from the aqueous sodium hydroxide and collected as product.

In more detail, the pulverized bauxite ore is fed to a slurry mixer where a caustic slurry is prepared. The slurry makeup caustic soda solution is typically spent liquor (described below) and additional caustic soda. The bauxite ore slurry is diluted and passed through a digester or a series of digesters where, under high pressure and temperature, about 98% of the total available alumina is released from the ore as caustic-soluble sodium aluminate. After digestion, the slurry passes through several flash tanks wherein the pressure of the digested slurry is reduced from several atmospheres to one atmosphere and the temperature of the slurry is reduced from about 200°C. to about 105° C.

The aluminate slurry leaving the flashing operation contains about 1 to 20 weight percent solids, which solid consists of the insoluble residue that remains after, or is precipitated during, digestion. The coarser solids may be removed from the aluminate liquor with "sand trap" cyclones. The finer solids are generally separated from the liquor first by gravity settling aided by a flocculant and then filtration, if necessary. In some cases, the slurry of aluminate liquor leaving the flash tanks is diluted by a stream of recycled washer overflow liquor. Any Bayer process slurry taken from the digesters through a subsequent dilution of the slurry, including the flash tanks, but before the primary settler, is referred to hereinafter as the primary settler feed.

Normally, the primary settler feed is thereafter fed to the primary settler (or decanter) where it is treated with a flocculent. As the mud settles, the clarified sodium aluminate solution (referred to as "green" or "pregnant" liquor) overflows to a weir at the top of the vessel and is collected. This overflow from the primary settling tank is then passed to subsequent process steps.

The clarity of the primary settler overflow is crucial to efficient processing of alumina trihydrate. If the aluminate liquor overflowing the settler contains an unacceptable concentration of suspended solids (at times from about 10 to about 500 mg suspended solids per liter), it must be further clarified by filtration to give a filtrate with no more than 10 mg suspended solids per liter of liquor. The treatment of the liquor collected after the primary settlement to remove any residual suspended solids before alumina trihydrate is recovered is referred to as a secondary clarification stage.

The clarified sodium aluminate liquor is cooled and seeded with alumina trihydrate crystals to induce precipitation of alumina in the form of alumina trihydrate, $Al(OH)_3$. The alumina trihydrate particles or crystals are then classified by particle size and separated from the concentrated caustic liquor. A flocculant is used to aid in this classification and separation process. The very fine particles of alumina trihydrate are returned as the seed crystals and the coarser particles are collected as product. The remaining liquid phase, referred to as "spent liquor," is then returned to the initial bauxite slurry make up and digestion step and employed as a digestant after reconstitution with caustic.

The settled solids of the primary settler are withdrawn from the bottom of the settler or decanter (and referred to as "underflow") and then passed through a countercurrent washing circuit for the recovery of sodium aluminate and soda. Overflow liquor from the first washing vessel (or "thickener") is recycled either as primary settler feed, diluting the slurry as it leaves the flash tanks, and/or it may be passed to filtration along with the overflow from the primary settler.

The partial separation of the red mud solids from the pregnant liquor in the primary settler (or decanter) is expedited by the use of a flocculent. This initial clarification of the pregnant liquor is referred to as the primary settler stage. Flocculating agents, such as liquid emulsion polymers, dry polymers and polysaccharides including starch, are commonly used to improve the separation of the insoluble red mud solids by increasing the rate at which these solids settle, by reducing the amount of residual solids suspended in the liquor, and by decreasing the amount of liquor in the settled solids phase, or underflow. Flocculation performance is critically important in the primary settling stages. Red mud solids comprised mostly of iron oxides (typically at least about 50 weight percent of the red mud solids), together with silicon oxides, calcium titanates, calcium phosphate, aluminum hydroxide, sodium alumino-silicates and other materials, commonly represent from about 5 to about 50 weight percent of the materials of the bauxite ore. Generally, these red muds are composed of very fine particles, which hinder the desired rapid and clean separation of the red mud particles from the solubilized alumina liquor. Improving the rate of separation improves the overall process efficiency and increases the output of alumina production. Improving the clarification of the process liquors reduces the need for filtration and further purification and can also increase alumina production. If the separation of the red mud particles is not clean, the resultant solubilized aluminate liquor will require a more extensive treatment to remove residual solids, and/or the alumina trihydrate recovered will contain levels of impurities that are undesirably high for many end-uses of the alumina.

SUMMARY OF THE INVENTION

In its principal aspect, this invention is directed to a method of flocculating suspended solids in a Bayer process liquor comprising adding to the liquor an effective amount of a polymer comprising salicylic acid groups.

The polymers of this invention effectively flocculate suspended solids in Bayer process liquors. In particular, use of these polymers in Bayer process caustic aluminate streams reduces the suspended red mud solids and significantly reduces the need for filtration of the pregnant liquor. Lower solids in the overflow liquor also reduce the amount of impurities such as iron oxide and other minerals, thus improving the purity of the alumina produced during precipitation.

The polymers of this invention also effectively clarify alumina trihydrate from Bayer process streams. During continuous or batch precipitation of the alumina trihydrate, coarse particles are separated from fine crystals primarily by gravity settling. A slurry of fine particles is sent to a series of secondary and tertiary clarifiers to concentrate the particles according to size. Flocculation and settling of the very fine particles is significantly improved by the addition of the polymers of this invention, resulting in reduced aluminum tri-hydrate solids in the spent liquor when compared with conventional processes, including the use of polysaccharides such as starch and dextran and/or combinations with polymers of acrylic acid and salts thereof.

The polymers of this invention show excellent affinity towards alumina trihydrate particles, flocculating such particles, and increasing the rate at which these particles settle. The very fine particles of alumina trihydrate can then be returned as seed crystals in the primary crystallization step. Use of the polymers of this invention reduces the suspended fine aluminum tri-hydrate in the tertiary classifier overflow, thereby improving the recovery of the alumina, ensuring that less alumina is recycled to digestion with the spent liquor.

DETAILED DESCRIPTION OF THE INVENTION

Definitions of Terms

"Acyl" means a group of formula —C(O)R where R is alkyl or aryl. A preferred acyl is acetyl (R=CH$_3$).

"AIBN" means 2,2'-azobis(2-methylpropionitrile), available from E. I. DuPont de Nemours and Co., Wilmington, Del. under the tradename Vazo® 64.

"AIVN" means 2,2'-azobis(2,4-dimethylvaleronitrile), available from E. I. DuPont de Nemours and Co., Wilmington, Del. under the tradename Vazo® 52.

"Alkyl" means a monovalent group derived from a straight or branched chain saturated $C_1$–$C_4$ hydrocarbon by the removal of a single hydrogen atom. Representative alkyl groups include methyl, ethyl, n- and iso-propyl, n-, sec-, iso- and tert-butyl, and the like. A preferred alkyl is methyl.

"Alkyl (meth)acrylate" means the alkyl ester of acrylic acid or methacrylic acid.

"Anionic monomer" means a monomer as defined herein which possesses a net negative charge above a certain pH value. Representative anionic monomers include base addition salts of acrylic acid, methacrylic acid, itaconic acid, 2-acrylamido-2-methyl propane sulfonate, sulfopropyl acrylate or methacrylate or other water-soluble forms of these or other polymerizable carboxylic or sulfonic acids, sulphomethylated acrylamide, allyl sulphonate, sodium vinyl sulphonate, and the like.

"Aryl" means an aromatic monocyclic or multicyclic ring system of about 6 to about 14 carbon atoms. Representative aryl groups include phenyl, naphthyl and anthracenyl. A preferred aryl is phenyl.

"Base addition salt" means the salt resulting from reaction of a carboyxlic acid (—CO$_2$H) group with a suitable base such as the hydroxide, carbonate, or bicarbonate of a metal cation or tetraalkylammonium cation, or with ammonia, or an organic primary, secondary, or tertiary amine of sufficient basicity to form a salt with the carboxylic acid group. Representative alkali or alkaline earth metal salts include sodium, lithium, potassium, calcium, magnesium, and the like. Representative organic amines useful for the formation of base addition salts include ethylamine, diethylamine, ethylenediamine, ethanolamine, diethanolamine, piperazine, and the like. Preferred base addition salts include the sodium and ammonium salts.

"EDTA" means ethylenediaminetetraacetic acid and the base addition salts thereof, available from Aldrich Chemical Company, Milwaukee, Wis.

"IV" means intrinsic viscosity, which is RSV in the limit of infinite polymer dilution (i.e. the polymer concentration approaching zero). The IV is obtained by extrapolating the plot of RSV versus polymer concentration in the range of 0.015–0.045 weight percent polymer to the intercept of the y axis.

"(Meth)acrylic acid" means acrylic acid or methacrylic acid and the base addition salts thereof.

"Monomer" means a polymerizable allylic, vinylic or acrylic compound. The monomer may be anionic, cationic, nonionic or zwitterionic. Vinyl monomers are preferred, acrylic monomers are more preferred.

"Nonionic monomer" means a monomer as defined herein which is electrically neutral. Representative nonionic monomers include acrylamide, methacrylamide, alkyl esters of acrylic and methacrylic acid such as methyl acrylate, acrylonitrile, methacrylonitrile, N-methyl(meth)acrylamide, N,N-dimethyl(meth)acrylamide, N-isopropyl(meth)acrylamide, N-(2-hydroxypropyl)(meth)acrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acryate, N-vinyl-2-pyrrolidone, glycerol mono((meth)acrylate), 2-hydroxyethyl (meth)acrylate, vinyl methylsulfone, vinyl acetate, and the like. Preferred nonionic monomers include acrylamide and methacrylamide. Acrylamide and methyl acrylate are more preferred.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;

$\eta_o$=viscosity of solvent at the same temperature; and c=concentration of polymer in solution.

The units of concentration "c" are (grams/100 mL or g/deciliter). Therefore, the units of RSV are dL/g. The RSV is measured at 30° C. The viscosities $\eta$ and $\eta_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about + or −2 dL/g. Similar RSVs measured for two linear polymers of identical or very similar composition is one indication that the polymers have similar molecular weights, provided that the polymer samples are treated identically and that the RSVs are measured under identical conditions.

In the case of the inverse emulsion polymers described herein, the inversion is conducted in 1% sodium hydroxide solution at an emulsion concentration of 1% by weight (based on the emulsion).

In the case of the water continuous emulsion polymers described herein, the polymer is hydrolyzed in 1% sodium hydroxide solution at an emulsion concentration of 1% by weight.

"Salicylic acid containing monomer" means a monomer unit having pendant salicylic acid group(s) as defined herein. Representative salicylic acid containing monomers include 3-acrylamidosalicylic acid and its base addition salts, 3-methacrylamidosalicylic acid and its base addition salts, 4-acrylamidosalicylic acid and its base addition salts, 4-methacrylamidosalicylic acid and its base addition salts, 5-acrylamidosalicylic acid and its base addition salts, 5-methacrylamidosalicylic acid and its base addition salts, 4-acrylamidosalicylic acid phenyl ester, 4-methacrylamidosalicylic acid phenyl ester, O-acetyl-4-acrylamidosalicylic acid, O-acetyl-4-methacrylamidosalicylic acid, 3-hydroxystyrene-4-carboxylic acid, 4-hydroxystyrene-3-carboxylic acid, and the like.

Preferred salicylic acid containing monomers are 4-methacrylamidosalicylic acid, 4-methacrylamidosalicylic acid phenyl ester, O-acetyl-4-methacrylamidosalicylic acid and O-acetyl-4-methacrylamidosalicylic acid phenyl ester.

"Salicylic acid containing polymer" means a water soluble or water insoluble polymer containing salicylic acid groups. The salicylic acid group may be incorporated into the polymer backbone or may be pendant to the polymer backbone. The salicylic acid containing polymers of this invention have a RSV of greater than about 1 dL/g when measured at 400 ppm (based on non-ionized acid mer units) in 2M $NaNO_3$ as described herein. Preferred polymers have a RSV of greater than 14 dL/g. More preferred polymers have a RSV of greater than 20 dL/g. Polymers containing pendant salicylic acid groups are prepared by polymerizing one or more salicylic acid containing monomers with one or more nonionic or anionic monomers, or by grafting one or more salicylic acid groups onto a preformed natural or synthetic polymer backbone. Salicylic acid containing polymer comprising pendant salicylic acid groups preferably comprise from about 1 to about 90, more preferably from about 1 to about 20 and still more preferably from about 3 to about 10 mole percent of pendant salicylic acid groups.

Polymers incorporating salicylic acid into the backbone are prepared by condensation polymerization of one or more salicylic acid compounds and formaldehyde or by condensation polymerization of one or more salicylic acid acid compounds, formaldehyde and one or more compounds containing a reactive hydrogen center.

"Salicylic acid group" means a group of formula

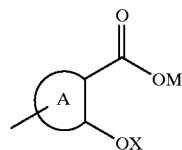

where M is hydrogen, alkyl, aryl or a base addition salt; X is hydrogen or acyl; and the group

represents an aryl group as defined herein, where

is optionally substituted with $-NO_2$, $-OH$, $-SO_3H$. Representative salicylic acid groups include salicylic acid, salicylic acid methyl and phenyl ester, O-acetylsalicylic acid, O-acetylsalicylic acid methyl and phenyl ester, 2-hydroxy-5-nitrobenzoic acid, 2,3-dihydroxybenzoic acid, 2,4-dihydroxybenzoic acid, 2,5-dihydroxybenzoic acid, 2,6-dihydroxybenzoic acid, 5-sulfosalicylic acid, 1-hydroxy-2-napthoic acid, 3-hydroxyanthracene-2-carboxylic acid, 3- and 5-formylsalicylic acid, and the like. Preferred salicylic acid groups are salicylic acid, salicylic acid phenyl ester, O-acetylsalicylic acid and O-acetylsalicylic acid phenyl ester.

"Zwitterionic monomer" means a polymerizable molecule containing cationic and anionic (charged) functionality in equal proportions, so that the molecule is net neutral overall.

Preferred Embodiments

In one preferred aspect of this invention, the salicylic acid containing polymer is selected from the group consisting of dispersion polymers, emulsion polymers, inverse emulsion polymers, dry polymers and solution polymers.

"Dispersion" polymer means a water-soluble polymer dispersed in an aqueous continuous phase containing one or more inorganic salts. Representative examples of dispersion polymerization of water-soluble polymers in an aqueous continuous phase can be found in U.S. Pat. Nos. 4,929,655; 5,006,590; 5,597,859; and 5,597,858; and in European Patent Nos. 657,478; and 630,909.

Dispersion polymers are prepared by combining water, one or more inorganic salts, one or more water-soluble monomers, any polymerization additives such as chelants, pH buffers or chain transfer agents, and a water-soluble stabilizer polymer. This mixture is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen whilst maintaining temperature and mixing for several hours. During the course of the reaction, a discontinuous phase containing the water-soluble polymer is formed. After this time, the products are cooled to room temperature, and any post-polymerization additives are charged to the reactor. Water continuous dispersions of water-soluble polymers are free flowing liquids with product viscosities generally 100–10,000 cP, as measured at low shear rates. The advantages of preparing water-soluble polymers as water continuous dispersions are similar to those mentioned below in association with the inverse emulsion polymers. The water continuous dispersion polymers have the further advantages that they contain no hydrocarbon oil or surfactants, and require no surfactant for "inversion" or activation.

"Inverse emulsion polymer" and "latex polymer" mean an invertible water-in-oil emulsion polymer consisting of an aqueous polymer phase dispersed as micron size particles in a hydrocarbon oil continuous phase, various emulsifying agents, and, potentially, an inverting surfactant. The advantages of polymerizing water-soluble monomers as inverse emulsions include 1) low fluid viscosity can be maintained throughout the polymerization, permitting effective mixing and heat removal, 2) the products can be pumped, stored, and used easily since the products remain liquids, and 3) the polymer "actives" or "solids" level can be increased dramatically over simple solution polymers, which, for the high molecular weight flocculants, are limited to lower actives because of viscosity considerations. The inverse emulsion polymers are then "inverted" or activated for use by releasing the polymer from the particles using shear, dilution, and, generally, another surfactant, which may or may not be a component of the inverse emulsion.

Inverse emulsion polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion and polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

The oil phase comprises any inert hydrophobic liquid. Preferred hydrophobic liquids include aliphatic and aromatic hydrocarbon liquids including benzene, xylene, toluene, paraffin oil, mineral spirits, kerosene, naphtha, and the like. Paraffin oil is preferred.

Free radical yielding initiators such as benzoyl peroxide, lauroyl peroxide, Vazo® 64, Vazo® 52, potassium persulfate and the like are useful in polymerizing vinyl and acrylic monomers. Vazo® 64 and Vazo® 52 are preferred. The initiator is utilized in amounts ranging between about 0.002 and about 0.2 percent by weight of the monomers, depending upon the solubility of the initiator.

Water-in-oil emulsifying agents useful for preparing the inverse emulsion polymers of this invention include sorbitan esters of fatty acids, ethoxylated sorbitan esters of fatty acids, and the like or mixtures thereof. Preferred emulsifying agents include sorbitan monooleate, polyoxyethylene sorbitan monostearate, and the like. Additional details on these agents may be found in McCutcheon's *Detergents and Emulsifiers,* North American Edition, 1980. Any inverting surfactant or inverting surfactant mixture described in the prior art may be used. Representative inverting surfactants include ethoxylated nonylphenol, ethoxylated linear alcohols, and the like. Preferred inverting surfactants are ethoxylated linear alcohols.

The polymer is prepared by polymerizing the appropriate monomers at from about 1° C. to about 85° C. over about 1 to about 24 hours, preferably at a temperature of from about 40° C. to about 70° C. over about 3 to about 6 hours.

"Emulsion polymer" means a water-continuous dispersion of a water-insoluble polymer. The preparation of high molecular weight emulsion polymers such as poly(methyl acrylate) is described in U.S. Pat. No. 6,036,869. The polymer is rendered water soluble when activated with caustic solution to hydrolyze the ester groups and generate poly(sodium acrylate). Among the advantages of polymerizing in the water continuous format are that no hydrocarbon oil is present in the product (as is the case with the inverse emulsion systems), low viscosity fluids are obtained as products (<100 cP is typical), and spills are easily cleaned up since the polymer is not water soluble until activated.

In the preparation of a water continuous dispersion, an aqueous mixture of one or more water soluble or water miscible surfactants is prepared such that a homogeneous solution results. Thereafter, one or more water insoluble monomers are added to this mixture with shear such that a water continuous emulsion is formed. After the emulsion has formed, the reaction vessel is cooled to below ambient temperature and purged with a nitrogen stream. After this, a stream of redox initiators are fed to the polymerization over time. Typical initiators include iron salts, peroxides and hydroperoxides, persulfates, bisulfites, and the like.

A typical polymerization may last three to four hours, after which time the emulsion is allowed to warm to ambient temperature, filtered and transferred to storage. Once the polymers are hydrolyzed in caustic solution, they may be characterized by the measurement of a RSV in a fashion similar to the inverse emulsion polymers.

"Dry polymer" means a polymer prepared by drying a polymer prepared by "gel" polymerization. The preparation of high molecular weight water-soluble polymers as dry powders using a gel polymerization is generally performed as follows: an aqueous solution of water-soluble monomers, generally 20–60 percent concentration by weight, along with any polymerization or process additives such as chain transfer agents, chelants, pH buffers, or surfactants, is placed in an insulated reaction vessel equipped with a nitrogen purging tube. A polymerization initiator is added, the solution is purged with nitrogen, and the temperature of the reaction is allowed to rise uncontrolled. When the polymerized mass is cooled, the resultant gel is removed from the reactor, shredded, dried, and ground to the desired particle size.

Alternatively, dry polymers are prepared by spray drying emulsion, solution or dispersion polymers of this invention prepared as described herein.

Although it is not possible to prepare concentrated solutions of the same high molecular weight polymers prepared as inverse emulsions, water continuous dispersions, or gel polymers owing to the extremely high viscosities which are encountered, it is sometimes desirable to prepare lower molecular weight polymers of similar composition as solutions in water. To conduct a solution polymerization of water soluble monomers, the desired monomers are dissolved in water, generally at concentrations between 5 and 40%, along with any buffers, acid or caustic, chelants, chain transfer agents. The solution is purged with nitrogen and heated to the polymerization temperature. After the polymerization temperature is reached, one or more water soluble initiators is added. These initiators may be either of the azo type or of the redox type. Then, depending on the desired polymer characteristics, the temperature is either allowed to rise uncontrolled (adiabatic) or is controlled with cooling to remove the heat generated (isothermal). After the polymerization is complete, the solution of polymer can be removed from the reaction vessel, transferred to storage and characterized.

The polymer of this invention is also prepared by functionalizing natural or synthetic polymer with salicylic acid groups. For example, poly(acrylamide) containing pendant salicylic acid groups is prepared by Mannich reaction (formaldehyde, HCl) of poly(acrylamide). Similarly, naturally occurring polymers such as proteins can be functionalized with salicylic acid groups under Mannich conditions as described above. Alternatively, proteins and carbohydrates can be reacted with salicylic acid derivatives such as chloromethylated salicylic acid to incorporate pendant salicylic acid groups into the polymer.

Salicylic acid containing polymers of this invention that incorporate salicylic acid groups into the polymer backbone are prepared by condensation polymerization of substituted or unsubstituted salicylic acid and formaldehyde or by condensation polymerization of one or more salicylic acid compounds, formaldehyde and one or more compounds containing a reactive hydrogen center.

Representative compounds containing a reactive hydrogen center include ureas, amides such as acrylamide, amines such as melamine, dimethylamine, aniline, and the like, or aromatic compounds such as benzene, toluene, phenol, anisole, resorcinol, and the like. Preferred compounds that contain an active hydrogen center include urea, phenol, anisole, rescorcinol and melamine.

In a preferred aspect, the polymer is selected from the group consisting of dispersion polymers, emulsion polymers, inverse emulsion polymers, dry polymers and solution polymers.

In another preferred aspect, the polymer comprises pendant salicylic acid groups.

In another preferred aspect, the polymer is prepared by free radical polymerization of one or more salicylic acid containing monomers and one or more acrylate monomers selected from the group consisting of (meth)acrylic acid and alkyl esters of (meth)acrylic acid.

In another preferred aspect, the salicylic acid containing monomers are selected from the group consisting of 4-methacrylamidosalicylic acid, 4-methacrylamidosalicylic acid phenyl ester, O-acetyl-4-methacrylamidosalicylic acid and O-acetyl-4-methacrylamidosalicylic acid phenyl ester and the acrylate monomers are selected from the group consisting of methyl acrylate and acrylic acid.

In another preferred aspect, the polymer is selected from the group consisting of emulsion polymers and inverse emulsion polymers.

In another preferred aspect, the polymer comprises from about 80 to about 99 mole percent sodium or ammonium acrylate and from about 1 to about 20 mole percent 4-methacrylamidosalicylic acid, 4-methacrylamidosalicylic acid phenyl ester, O-acetyl-4-methacrylamidosalicylic acid or O-acetyl-4-methacrylamidosalicylic acid phenyl ester.

In another preferred aspect, the polymer comprises from about 88 to about 98 mole percent methyl acrylate, from about 1 to about 6 mole percent sodium acrylate and from about 1 to about 6 mole percent 4-methacrylamidosalicylic acid, 4-methacrylamidosalicylic acid phenyl ester, O-acetyl-4-methacrylamidosalicylic acid or O-acetyl-4-methacrylamidosalicylic acid phenyl ester.

In another preferred aspect, the polymer comprises backbone salicylic acid groups.

In another preferred aspect, the polymer is salicylic acid-formaldehyde copolymer.

In another preferred aspect, the polymer is a condensation polymer of one or more substituted or unsubstituted salicylic acid compounds, formaldehyde and one or more active hydrogen compounds.

In another preferred aspect, the salicylic acid compound is unsubstituted salicylic acid and the active hydrogen compound is selected from the group consisting of amides, ureas, amines and aromatic compounds.

Bayer process liquors generally are aqueous media containing dissolved sodium aluminate and red mud solids at various concentrations. Such liquors include the primary settler slurry or feed, which contains high concentration levels of both red mud and dissolved sodium aluminate, the red mud washing slurries, which have high red mud concentrations but lesser concentrations of sodium aluminate and total alkalinity, and the secondary clarification liquors, which are rich in dissolved sodium aluminate but contain much less red mud than the other types of liquors. Additional liquors include red mud slurries which are dewatered in centrifuges or on vacuum drum or disc filters, as well as red mud slurries which are flocculated to improve their mud stacking properties or to improve the tendency to release water from the mud slurry. As discussed above, the separation of the red mud from the sodium aluminate and its aqueous phase is continued from the primary settlement stage until concentrated red mud is eliminated from the process circuit, and from the primary settlement stage until the clarified liquor is subjected to the alumina trihydrate crystallization.

The flocculation of red mud, which routinely precedes or follows either settling or filtration, is most difficult in the primary settlement stage because of the high concentration of fine particles, and the high concentration of total alkalinity. Improvement of the flocculation effectiveness in the primary settlement stage is extremely important to the entire Bayer process. By reducing the level of suspended solids that remain in the supernatant above the settled mud solids formed in the primary settler liquor, the solids to be removed during secondary clarification stages are reduced.

In the Bayer process, the bauxite ore is digested under highly alkaline conditions, and the typical primary settler liquors are routinely highly alkaline, containing sodium hydroxide, sodium aluminate, and commonly sodium carbonate. The total alkalinity of the primary settler feed, that is the liquor charged to the primary settlement stage, is typically from about 100 to 300 grams per liter of settler feed, as sodium carbonate equivalent. The solids contents of typical primary settler feeds vary from about 25 to about 85 grams per liter of settler feed.

Primary settler feed means the Bayer process digested slurry as charged to the flash tanks or other vessels emptying into the primary settler. Such feed may be an admixture of the digested slurry plus dilution liquor, and the dilution liquor is routinely the counter current technique wash water from the red mud washing stages discussed above. The primary settler feed differs from the liquors or slurries subjected to clarification and/or separation in the secondary clarification stage or the red mud washing stages by composition as to the solids content, dissolved sodium aluminate content, and total alkalinity. The primary settler feed also differs from the liquors or slurries in that no insoluble fraction thereof has received an earlier flocculation treatment.

Accordingly, improved clarification of Bayer process primary settler liquors is one aspect of this invention. Nonetheless in its broadest sense, this invention is directed to the clarification and settling of red mud-containing liquors in any aspect of mineral processing wherein such red mud is found. For example, the polymers of this invention may be used in the counter-current wash liquors, primary settler liquors of the Bayer process, as well as in red mud which is dewatered in centrifuges or by vacuum filtration (drum filters, and disc filters among others) or in the settler overflow to improve filtration in the polishing filters (either pressure or sand filters) or in red mud which is flocculated after the last mud washing stage to improve the mud stacking properties in the mud disposal area, or in red mud which must be made useful for other purposes.

Upon flocculation of a primary settler feed, using the polymers of this invention, a liquor/mud interface will form upon settling of the mud solids. The supernatant liquor is low in suspended solids (generally ranging from about 10 to about 500 mg/l) and overlies a mud layer. The lower mud layer contains the flocculated material, and as discussed above, is comprised of both red mud solids (generally ranging from about 10 to about 70% mud solids by weight) and some amount of pregnant liquor. The overlying supernatant is the liquor that is separated for secondary clarification, again as discussed above. The interface between the supernatant mud liquor and the mud layer is clearly seen in some cases, but the supernatant is not entirely free of suspended solids, appearing instead as a translucent liquid. The present invention diminishes the amount of suspended solids in such supernatant, and hence decreases the extent of secondary clarification required to obtain a given purity of sodium aluminate solution. Use of the polymers of this invention also reduces or eliminates the need for starch by improved supernatant liquor clarity and improved red mud stability, and the rheological properties of the concentrated red mud slurry.

The digested slurry is typically discharged from the flash tanks at elevated temperatures. The primary settler feed is generally not further cooled before charging to the primary settlement stage other than the cooling which may occur when a digested slurry is optionally admixed with the liquor from the first red mud wash stage to form a primary settler feed. The flocculation of the primary settler feed is conducted at atmospheric pressures and at elevated temperatures of from about 80° C. to about 110° C. The flocculation of the primary settled feed can also be conducted at elevated pressures and temperatures as high as 200° C.

The following applies to any aspect of this invention. High and/or lower molecular weight salicylic acid containing polymers may be used in combination with any conventional nonionic polysaccharide flocculant such as starch, dextran, alginate and flour, and anionic flocculants such as homopolymers of acrylic acid or acrylates, co-ploymers of acrylic acid or acrylates containing at least 50 molar percent acrylic acid or acrylate monomers, alkali metal, alkaline earth metal or ammonium salts of said acids, or a polyacrylate alkyl ester of acrylate copolymer with 60 to about 90 percent of the alkyl ester groups hydrolyzed. Any of the above anionic flocculants may be further functionalized with pendant hydroxamic acid groups. The salicylic acid containing polymer may be added before, after or simultaneously with any of the foregoing.

The polymers may also be utilized to treat the last stage washer underflow at the mud disposal site to improve mud stacking, or more rapid release of liquor from the mud. Moreover, the polymers may also be utilized for the treatment of mud filters, including but not limited to drum and vacuum filters.

Water soluble polymers of this invention are used as follows: A solution of the polymer is prepared in an appropriate dilution water stream typically as an about 0.1 to about 1 weight percent polymer active solution. This solution is added to the digested bauxite sodium aluminate process stream containing suspended solids in an amount sufficient to settle said solids. For example, the polymer is injected into the feed-line upstream of the settling vessel and/or added to the center-well of the settling vessel.

Alternatively, water-continuous polymers of this invention are added neat or as a dilute solution to the primary liquor feed of a Bayer process. The water continuous polymers hydrolyze in situ in the Bayer process liquor itself. In more detail, co-polymers and or terpolymers formed from acrylic acid and/or acrylic acid esters and salicylic esters may not be active as red mud flocculants until the ester groups are hydrolyzed. When placed in the Bayer process liquor in the presence of red mud, the high alkalinity and the high temperatures convert the polymers to effective red mud flocculants by hydrolyzing the various ester groups to ionized acrylic acid and salicylic acid groups. Furthermore, the polymer does not hydrolyze instantly, but rather over time. Therefore, the poly (acrylic acid/acrylic acid ester/salicylic acid ester) essentially is being activated continuously.

The salicylic acid containing polymers are injected upstream from the primary settler, such as in one of the flash tanks or between the flash tanks and the primary settler feed well where there is sufficient temperature and residence time to allow the hydrolysis of the polymer. The hydrolysis will progress as the polymer and mud make their way from the flash tanks down the various piping and into the primary settler.

The red mud containing liquor may be a primary settler feed, a mud washer feed, a centrifuge feed or the polishing filter feed (pressure or sand filter). The feed may be from a digester blow-off, diluted digester blow-off, primary settler underflow, washer underflow, or a combination of settler and washer underflows with other process streams including but not limited to settler overflow, washer overflows, lake return water or raw water. The polymers described herein, when utilized to treat Bayer process red-mud containing liquor, result in an increase in both clarity and settling rate.

The water-continuous polymers of this invention may be hydrolyzed in a caustic solution, using various plant liquor streams alone or combinations thereof such as spent liquor, pregnant liquor, any washing circuit overflow liquor containing some caustic, lake return water, and/or condensate waters with addition of caustic, prior to being added to the primary liquor feed of a Bayer process as details above.

In another preferred aspect, the polymer is hydrolyzed prior to addition to the Bayer process liquor.

In another preferred aspect, the Bayer process liquor is selected from settler feed, settler overflow, digestion blow-off, mud washer in the washer train, feed to the primary polishing filters, feed to a mud settler, feed to the primary alumina crystallization tanks, feed to the secondary and tertiary alumina classifers or trays, feed to hydrate filters or feed to a centrifuge.

In another preferred aspect, one or more anionic or nonionic flocculant(s) are added to the liquor.

In another preferred aspect, the nonionic flocculant is starch, dextran or flour.

In another preferred aspect, the anionic flocculant comprises poly (meth)acrylic acid.

In another preferred aspect, the poly (meth)acrylic acid is selected from the group consisting of poly(meth)acrylic acid, poly(meth)acrylic acid containing pendant hydroxamic acid groups, poly (alkyl (meth)acrylate), (meth)acrylic acid/ alkyl (meth)acrylate copolymers, (meth)acrylic acid/ acrylamide copolymers, (meth)acrylic acid/acrylamide copolymers containing pendant hydroxamic acid groups, (meth)acrylic acid/acrylamide/alkyl (meth)acrylate terpolymers, and (meth)acrylic acid/acrylamide/AMPS terpolymers.

In another preferred aspect, the anionic flocculant is added prior to the salicylic acid containing polymer.

In another preferred aspect, the anionic flocculant is added after the salicylic acid containing polymer.

In another preferred aspect, the anionic flocculant is added together with the salicylic acid containing polymer.

In another preferred aspect, the salicylic acid containing polymer has an RSV of from about 14 to about 21 dL/g and the anionic flocculant has an RSV greater than about 31 dL/g.

The foregoing may be better understood by reference to the following examples, which are presented for illustration and are not intended to limit the scope of the invention.

EXAMPLE 1

Preparation of 4-methacrylamidosalicylic acid (4-MASA)

In a 5 L flask, 250 g of 4-aminosalicylic acid (Aldrich Chemical Co., Milwaukee, Wis.) is dissolved in 2.0 L of acetone under a nitrogen atmosphere with the aid of mechanical stirring. To this is added, at room temperature, 375 g of methacrylic anhydride (Aldrich) dropwise over 1 hour. After stirring for 16 hours, the volume of acetone is reduced to 1.0 L by vacuum distillation. The crude solid product which precipitates from solution is collected by vacuum filtration. The product is washed with 500 mL of 5:1 water:methanol and purified further by stirring the solid for 30 minutes in 1 L of 5:1 water:methanol. The solid is isolated by vacuum filtration and air-dried overnight to yield 295 g of a tan solid. This product is used without further purification.

EXAMPLE 2
Preparation of 4-methacrylamidosalicylic acid phenyl ester (4-MASAPE)

A solution of 29.6 g of phenyl 4-aminosalicylate (Aldrich) in 175 mL of acetone is cooled to 0° C. To this is added dropwise with stirring 29 mL of methacrylic anhydride (Aldrich) dissolved in 20 mL of acetone. The solution is allowed to warm to room temperature and is then heated at reflux for 20 hours. The reaction mixture is then cooled to room temperature and added to 400 mL of ice water. The resulting light yellow solid is isolated and dried under vacuum. The product is used without further purification.

EXAMPLE 3
Preparation of O-acetyl-4-methacrylamidosalicylic acid (A-4-MASA)

A few drops of concentrated sulfuric acid is added to a stirring solution of 35.0 g of 4-methacrylamidosalicylic acid (prepared according to Example 1) in 350 mL of acetic anhydride at 0° C. The solution is stirred for 60 minutes at 0° C. and then for an additional 6 hours at room temperature. The reaction mixture is then poured into 800 g of cold deionized water. The solid product precipitates from solution, and is collected by filtration. The product is then air dried at room temperature to afford A-4-MASA in quantitative yield.

EXAMPLE 4
Preparation of O-Acetyl-4-methacrylamidosalicylic acid phenyl ester (A-4-MASAPE)

Triethylamine (9.7 g) is added under nitrogen to a solution of 20.0 g of 4-methacrylamidosalicylic acid phenyl ester in 120 mL of acetone at 0° C. Acetyl chloride (7.52 g, Aldrich) in 40 mL of acetone is then added dropwise to the stirred reaction mixture. The mixture is stirred for 6 hours at room temperature. The reaction mixture is filtered and then concentrated in vacuo. The resulting solid is dissolved in acetone and the acetone mixture is slowly added to water. The resulting solid is filtered and dried under vacuum.

EXAMPLE 5
Preparation of a 3 mole percent 4-methacrylamidosalicylic acid (4-MASA)/97 mole percent sodium acrylate inverse emulsion copolymer by batch polymerization A 500 mL reaction flask equipped with a mechanical stirrer, reflux condenser, dropping funnel, gas inlet tube and a thermometer is charged with 33 g of acrylic acid and 45 g of deionized water. This solution is neutralized with sodium hydroxide (50% aqueous solution), such that the final pH is about 8.5. The neutralization is conducted in an ice bath and care is taken to ensure that the temperature of the monomer solution does not exceed 25° C. To the resulting neutralized solution is added 0.013 g of ethylenediaminetetraacetic acid, tetrasodium salt (EDTA, Aldrich). Separately, 3.67 g of 4-MASA is dissolved in 10.0 g of deionized water by adjusting the pH of this solution to about 12.5 with sodium hydroxide (50% aqueous solution). The two monomer solutions are combined and the pH of the resulting mixture is adjusted to about 10.5 with sodium hydroxide or sulfuric acid, as required.

An oil phase is prepared by heating a mixture of 45.2 g of a paraffinic solvent (Escaid® 110, Exxon, Houston, Tex.), 3.15 g of a sorbitan monooleate (Span® 80, ICI Americas, Wilmington, Del.), 1.37 g of a polyoxyethylene sorbitan monostereate (Tween® 61, ICI), 0.94 g of a polyoxyethylene sorbitan tristearate (Tween® 65, ICI), and 2.89 g of oleic acid (J. T. Baker, Phillipsburg, N.J.) until the surfactants are dissolved (54–57° C.). The oil phase is transferred into the reactor described above and heated to 45° C.

With stirring at 1000 rpm, the aqueous monomer phase is added over two minutes. The resulting water-in-oil emulsion is stirred for thirty minutes while it is purged with nitrogen. After this time, 0.0525 g of Vazo® 64 and 0.0075 g of Vazo® 52 is added to the water-in-oil emulsion. The polymerization is carried out under a nitrogen atmosphere at 45° C. for 4 hours, then at 55° C. for one hour. The finished emulsion product is then cooled to 25° C. The polymer has a reduced specific viscosity of 18.8 dL/g (measured as a 400 ppm solution in 2N sodium nitrate solution at 30° C.) and a Brookfield viscosity of 1050 cps (#3 spindle at 12 rpm).

EXAMPLE 6
Semi-batch polymerization to produce a 6 mole percent 4-methacrylamidosalicylic acid (4-MASA)/94 mole percent sodium acrylate inverse emulsion copolymer The reaction apparatus employed in this example is the same as that described in Example 4. Acrylic acid, 33 g and 0.013 g of EDTA is dissolved in 30 g of deionized water and neutralized with sodium hydroxide (50% aqueous solution) such that the final pH of the solution is about 8.5. The neutralization is conducted in an ice bath and care is taken to ensure that the temperature of the monomer solution does not exceed 25° C.

Separately, 6.65 g of 4-MASA is dissolved in 10.0 g of deionized water by adjusting the pH of the water to about 12.5 with sodium hydroxide (50% aqueous solution), and this solution is set aside.

An oil phase is prepared by heating (54–57° C.) 3.15 g of Span® 80, 1.37 g Tween® 61, 0.94 g of Tween® 65, and 2.89 g of oleic acid in 45.20 g of Escaid® 110 until the surfactants are dissolved. The oil phase is charged to the reactor and the contents of the reactor are stirred at 1000 rpm. The aqueous monomer phase is then added to the reactor over two minutes so that a water-in-oil emulsion is formed. The emulsion is purged with nitrogen and heated to 45° C. Polymerization is initiated by adding 0.0525 g of Vazo® 64 and 0.0075 g of Vazo® 52. After sixty minutes, the solution of 4-methacrylamidosalicylic acid is fed to the reactor over a few minutes. The polymerization is continued for another two hours at 45° C., and then for one hour at 55° C. After this time, the emulsion is cooled to room temperature. The polymer has a reduced specific viscosity of 17.4 dL/g (measured as a 400 ppm solution in 2N sodium nitrate solution at 30° C.) and a Brookfield viscosity of 3260 cps (#3 spindle at 12 rpm).

EXAMPLE 7
Continuous Feed Polymerization (CFP) to produce a 6 mole percent 4-methacrylamidosalicylic acid (4-MASA)/94 mole percent sodium acrylate inverse emulsion copolymer The reaction apparatus employed in this example is the same as that described in Example 4. Acrylic acid (33 g) and 0.013 g of EDTA is dissolved in 30 g of deionized water and neutralized with sodium hydroxide (50% aqueous solution) such that the final pH of the solution is about 8.5. The neutralization is conducted in an ice bath and care is taken to ensure that the temperature of the monomer solution does not exceed 25° C.

Separately, 6.65 g of 4-MASA is dissolved in 10.0 g of deionized water by adjusting the pH of the water to about 12.5 with sodium hydroxide (50% aqueous solution), and this solution is set aside.

An oil phase is prepared by heating (54–57° C.) 3.15 g of Span® 80, 1.37 g Tween® 61, 0.94 g of Tween® 65, and 2.89 g of oleic acid in 45.20 g of Escaid® 110 until the surfactants are dissolved. The oil phase is charged to the reactor and the contents of the reactor are stirred at 1000 rpm. The aqueous monomer phase is then added to the reactor over two minutes so that a water-in-oil emulsion is formed. The emulsion is purged with nitrogen and heated to 45° C. Polymerization is initiated by adding 0.0525 g of Vazo® 64 and 0.0075 g of Vazo® 52. After fifteen minutes, the solution of 4-MASA is fed to the reactor over sixty minutes. The polymerization is continued for a total of three hours at 45° C., and then for one hour at 55° C. After this time, the emulsion is cooled to room temperature. The polymer has a reduced specific viscosity of 31.0 dL/g (measured as a 400 ppm solution in 2N sodium nitrate solution at 30° C.) and a Brookfield viscosity of 4300 cps (#3 spindle at 12 rpm).

EXAMPLE 8

Continuous Feed Polymerization (CFP) to produce a 3 mole percent 4-methacrylamidosalicylic acid (4-MASA)/97 mole percent sodium acrylate inverse emulsion copolymer at higher polymer solids The reaction apparatus employed in this example is the same as that described in Example 4. Acrylic acid (55.2 g) and 0.015 g of EDTA is dissolved in 66 g of deionized water and neutralized with sodium hydroxide (50% aqueous solution) such that the final pH of the solution is about 8.5. The neutralization is conducted in an ice bath and care is taken to ensure that the temperature of the monomer solution does not exceed 25° C.

Separately, 5.79 g of 4-MASA is dissolved in 10.00 g of deionized water by adjusting the pH of the water to about 12.5 with sodium hydroxide (50% aqueous solution), and this solution is set aside.

An oil phase is prepared by heating (54–57° C.) 3.15 g of Span® 80, 1.37 g of Tween® 61, 0.94 g of Tween® 65, and 2.89 g of oleic acid in 45.20 g of Escaid® 110 until the surfactants are dissolved.

The oil phase is charged to the reactor and the contents of the reactor are stirred at 1000 rpm. The aqueous monomer phase is then added to the reactor over two minutes so that a water in oil emulsion is formed. The emulsion is purged with nitrogen and heated to 45° C. Polymerization is initiated by adding 0.0525 g of Vazo® 64 and 0.0075 g of Vazo® 52. After fifteen minutes, the solution of 4-MASA is fed to the reactor over the course of sixty minutes. The polymerization is continued for a total of three hours at 45° C., and then for one hour at 55° C. After this time, the emulsion is cooled to room temperature and transferred to storage. The polymer has a reduced specific viscosity of 36.7 dL/g (measured as a 400 ppm solution in 2N sodium nitrate solution at 30° C.) and a Brookfield viscosity of 7300 cps (#3 spindle at 12 rpm).

The representative high molecular weight inverse emulsion polymers listed in Table 1 are prepared according to the method of Examples 5–8. In Table 1, Na (or NH$_4$) AA=sodium or ammonium acrylate and Na 4-MASA=4-methacrylamidosalicylic acid, sodium salt.

TABLE 1

Characterization of High Molecular Weight Water-In-Oil Emulsion Polymers Containing Pendant Salicylic Acid Groups

| Polymer | Na (or NH$_4$) AA/Na 4-MASA, mole % | RSV |
|---|---|---|
| 5 | Na, 98.5/1.5 | 28.2 |
| 6 | Na, 98.5/1.5 | 29.0 |
| 7 | NH$_4$, 96.5/3.5 | 24.1 |

TABLE 1-continued

Characterization of High Molecular Weight Water-In-Oil Emulsion Polymers Containing Pendant Salicylic Acid Groups

| Polymer | Na (or NH$_4$) AA/Na 4-MASA, mole % | RSV |
|---|---|---|
| 8 | Na, 96.5/3.5 | 23.6 |
| 9 | Na, 96.5/3.5 | 36.7 |
| 10 | Na, 96.5/3.5 | 18.8 |
| 11 | Na, 96.5/3.5 | 21.9 |
| 12 | Na, 94/6 | 17.4 |
| 13 | Na, 93.8/6.2 | 23.0 |
| 14 | Na, 93.8/6.2 | 31.0 |
| 15 | Na, 93.8/6.2 | 19.8 |
| 16 | NH$_4$, 93.8/6.2 | 18.8 |
| 17 | Na, 90/10 | 21.1 |
| 18 | NH$_4$, 90/10 | 16.6 |

EXAMPLE 9

Preperation of a 6 mole percent O-acetyl-4-methacrylamidosalicylic acid (A-4-MASA)/6 mole percent acryllic acid/88 mole percent methyl acrylate water continuous emulsion polymerization The apparatus employed for carrying out this example comprised a 250 mL reaction flask equipped with mechanical stirrer, reflux condenser, additional funnel, syringe pump, nitrogen gas inlet/outlet tube and thermometer. The temperature is controlled by using an acetone-dry ice bath.

Deionized water 95.96 g, is charged to the reaction vessel, along with 0.9 g of SAG2001 (Witco, Osi Specialties Group, Friendly, W.Va.). 6.6 g of 58% Rhodapex® CO-436 (Rhone-Poulenc, Cranbury, N.J.), 0.6 g of 70% IGEPAL-CA-89 (Rhone-Poulenc, Cranbury, N.J., 0.6 g, of Pluronic® F-68 (BASF, Parsippany, N.J.) and 0.03 g of EDTA, and the mixture is stirred until a clear solution is obtained. Thereafter, a mixture of 21.31 g of methyl acrylate, 1.06 g of acrylic acid, 0.047 g of formic acid and 7.84 g of A-4-MASA, (prepared according to Example 3) is added in one portion. The system is cooled to 10° C. and then purged with nitrogen thoroughly for 30 minutes. After this, 10.0 g of 0.0175% aqueous solution of ferrous sulfate and 10.0 g of 0.0175% aqueous solution of tertiary butyl hydroperoxide are introduced into the reaction mixture over one hour, during which time the temperature of the polymerization is maintained between 10–14° C. After the addition of the initiator solutions is complete, the polymerization is allowed to continue for another two hours. After this time, the temperature is raised to 25° C. and the system is stirred for 30 minutes. The resulting latex is filtered through a sieve to afford a milky white low viscosity product.

A polymer sample can be separated from the latex by precipitating a portion of the latex in an acetone-water mixture. The polymer sample is washed with deionized water and dried under vacuum at room temperature. Then, 0.6 g of the dried polymer, 4.0 g of NaOH (50% aqueous solution) and 195.4 g of deionized water is stirred for 5 hours at 85° C. The polymer has a RSV of 40.0 dL/g (measured under the conditions described in the previous examples).

EXAMPLE 10

Preparation of a 2 mole percent O-acetyl-4-methacrylamidosalicylic acid, phenyl ester (A-4-MASAPE)/1 mole percent acrylic acid/97 mole percent methyl acrylate water continuous emulsion polymer To a 0.25 L reaction flask equipped with mechanical stirrer, reflux condenser, additional funnel, syringe pump, nitrogen gas inlet and outlet tube, and thermometer is added 120.0 g of deionized water, 6.75 g of 58% Rhodapex® CO-436, 0.75 g of 70% IGEPAL-CA-89, 0.75 g of Pluronic® F-68 and 0.03 g of EDTA and the mixture is stirred until a clear solution is obtained. To the clear solution is added 0.9 g of SAG 2001, an antifoam, and nitrogen is purged through the solution for 15 minutes while the solution is cooled to 10° C.

Methyl acrylate, 40 g, A-4-MASAPE (prepared according to Example 4) 3.27 g, acrylic acid 0.7 g and formic acid 0.0375 g are mixed in an addition funnel and added to the emulsifier solution in the reactor and the nitrogen purge is continued for additional 10 minutes.

Then, 7.64 g of 0.0175% aqueous solution of ferrous sulfate heptahydrate and 7.64 g of 0.0175% aqueous solution of tertiary butyl hydroperoxide are pumped in at a rate so as to maintain a temperature of about 10–14° C. over one hour. After the addition of the initiator solutions is complete, the polymerization is allowed to continue for an additional two hours. After this time, the temperature is raised to room temperature and the system is stirred for 30 minutes. The resulting emulsion is filtered through a sieve to afford a milky white low viscosity product.

The emulsion polymer is hydrolyzed in 1% caustic solution at 1% emulsion concentration to determine the residual monomer by liquid chromatography (acrylic acid) and the reduced specific viscosity.

The representative high molecular weight emulsion polymers listed in Table 2 are prepared according to the method of Examples 9 and 10. In Table 2, MA=methyl acrylate, AA=acrylic acid and 4-MASA=4-methacrylamidosalicylic acid.

TABLE 2

Characterization of High Molecular Weight Oil-In-Water Emulsion Polymers Containing Pendant Salicylic Acid Groups

| Polymer | MA/AA/X), (mole %) | X | RSV (dL/g) |
|---|---|---|---|
| 1 | 88/6/6 | A-4-MASA | 40 |
| 2 | 96/1/3 | A-4-MASA | 31.7 |
| 3 | 98/2/1 | A-4-MASAPE | 16 |
| 4 | 93/6/1 | A-4-MASA | 28.8 |

EXAMPLE 11

Hydrolysis of 96/1/3 poly(methyl acrylate/acrylic acid/4-methacrylamidosalicylic acid) emulsion polymer Activity tests reported herein are performed using the poly (sodium acrylate/sodium 4-methacrylamidosalicylic acid) resulting from hydrolysis of the polymers prepared above and shown in Table 2. Hydrolysis is effected using 1% of the emulsion in 1% NaOH at 85° C. for 20 minutes.

The rate at which the poly(methyl acrylate/acrylic acid/4-methacrylamidosalicylic acid) polymers are hydrolyzed can be controlled by the caustic soda concentration and by the reaction temperature. As hydrolysis occurs, the polymers become more water soluble. For example, the percent hydrolysis of Polymer 2 at 1% of the emulsion in 1% NaOH at 85° C. for 15, 30, 45 60 90 and 120 minutes is measured and summarized in Table 3. Colloid titration is used to determine the anionic charge and the degree of hydrolysis.

TABLE 3

Hydrolysis of Polymer 2 in 10 g/L NaOH solution at 85° C.

| Hydrolysis Time | % Hydrolyzed |
|---|---|
| 15 min | 77 |
| 30 min | 93 |
| 45 min | 89 |
| 60 min | 93 |
| 90 min | 99 |
| 120 min | 100 |

EXAMPLE 12

Preparation of N-acrylamido-4-aminosalicylic acid sodium salt

In a reactor fitted with an addition funnel fitted with a drying tube, mechanical stirrer and a condenser are placed 4-amino salicylic acid sodium salt (21 g, 1.2 eq) and deionized water (400 g). This mixture is cooled to 10° C. and the pH is adjusted to about 12 by adding aqueous sodium hydroxide. A mixture of chloroform (200 mL) and acryloyl chloride (Aldrich, 9 g, 1 eq) are added dropwise via the addition funnel over a period of 15 minutes while vigorously stirring the sodium amino salicylate/water mixture. The temperature of the reaction mixture is maintained at 10° C. using an ice-bath. After two hours, the chloroform layer is separated. NMR studies indicate the aqueous phase contains N-acryloyl-4-amino salicylic acid as the major component.

The aqueous phase is then neutralized with acetic acid to pH 8 and the resulting precipitate is filtered, air-dried to constant weight (19.0 g) and used in the polymerization with sodium acrylate without further purification.

EXAMPLE 13

Preparation of sodium acrylate/sodium N-acrylamido-4-aminosalicylate (93/7 mole %) copolymer inverse emulsion A mixture of acrylic acid (80.9 g) and deionized water (114 g) in a 500 mL beaker equipped with a magnetic stirrer is cooled to 7–10° C. and a 50% solution of sodium hydroxide in water (92 g) is added dropwise over 30 minutes while maintaining the reaction mixture temperature below 15° C. After the addition of sodium hydroxide, powdered jV-acryloyl-4-amino salicylic acid (19 g, prepared as described in Example 11) is added and the mixture is stirred to form a homogenous solution.

In a polymerization reactor fitted with nitrogen inlet, condenser, mechanical stirrer and addition funnel is placed a mixture of Escaid® 110 (130 g), Ethomeen® T12 (9.24 g, Akzo America, Inc. Dobbs Ferry, N.Y.) and Brij® (ICI) 93 (4 g). The contents of the beaker from the previous step is added to this mixture. The beaker is then washed with deionized water (50 mL) and the washings are added to the reactor. The reaction mixture is stirred at 1000 rpm and heated to 38° C. After stirring for 30 minutes at 38° C., the reaction temperature is increased to 45° C. A mixture of Vazo® 64 (0.2 g) and Vazo® 52 (0.05 g) is added and the nitrogen purge started. The reaction mixture is kept at 45° C. for 7 hours and then at 60° C. for one hour. The reactor is then cooled and the product transferred to a container. The product has a RSV of 17.2 dL/g (400 ppm solution in 2N $NaNO_3$).

EXAMPLE 14

Preparation of salicylic acid/formaldehyde condensation polymer

In a reactor fitted with a condenser, addition funnel and a mechanical stirrer, deionized water (300 g) is heated to 95°

C. At this temperature, a mixture of powdered salicylic acid (40 g) and boric anhydride (0.2 g) is added. Aqueous formaldehyde (40%, 35 mL), pre-acidified with hydrochloric acid (6.5 mL, 1.19 density), is then added over 15 minutes. During the addition, the reaction temperature is maintained at 90–100° C. The reaction mixture is stirred for 60 minutes at 95° C. and then cooled to room temperature. The resulting polymer precipitate is filtered and dissolved in water (200 mL) containing 50% aqueous sodium hydroxide (26 mL) for performance testing.

EXAMPLE 15
Preparation of salicylic acid/resorcinol/formaldehyde condensation polymer In a reactor fitted with a condenser, addition funnel and a mechanical stirrer, a mixture of resorcinol (55 g), 50% aqueous sodium hydroxide solution (20 g) and deionized water (300 g) are heated to 60° C. with stirring. To this mixture, 30% aqueous formaldehyde solution (120 g) is added slowly over 15 minutes. The reaction mixture is then heated to 95° C. and stirred for one hour. The reaction mixture is then cooled to 50° C. and the pH is brought to 3.5 by adding dilute sulfuric acid. Salicylic acid powder (60 g) is added and the reaction mixture is heated to 95° C. and maintained at that temperature for one hour. Upon cooling a gummy resorcinol/salicylic acid/formaldehyde polymer separated from the reaction mixture. The gummy material completely dissolves in aqueous sodium hydroxide is used for performance testing without further purification.

EXAMPLE 16
Settling and Clarity Performance of Representative Salicylic Acid Containing Flocculants versus Conventional Polymer Treatments The settling and clarity performance of representative salicylic acid containing polymers of this invention is compared to conventional polymer treatments. The results are summarized in Tables 4–18. The data summarized in Tables 4–18 are obtained as described below.

The following general test procedure is utilized to obtain settling rate information. A well mixed sample of settler feed slurry (red mud obtained from a mineral processing facility) is portioned out into eighteen to twenty 1000-mL Nalgene® graduated cylinders by filling all the cylinders to the 500-mL graduation. The remaining 500-mL is then added to the cylinders in the opposite order. These cylinders are immediately placed in a clear-sided glass or plastic hot water bath maintained to 98–100° C. An alternative method involved performing the tests on a smaller scale using 0.1 or 0.25 L cylinders.

Cylinders containing the feed slurry are allowed to equilibrate to the bath temperature over a 20–30 min period.

While remaining in the water bath, the cylinder is immediately mixed by two plunges. The plunger is a ⅛" metal rod with a #10 rubber stopper attached to the bottom end. The plunger is allowed to fall freely on the downward stroke and lifted at the same speed on the upward stroke. To test a polymer, that polymer is added to the 1000 mL graduated cylinder and mixed with a constant number of plunges (typically four or six).

To determine settling rate, the time for the solid/liquid interface to travel between the 900 and 700 mL marks on the cylinder is recorded. After measuring the distance between the two marks, the settling rate can be calculated in (ft/hr) or (m/hr) units.

Based on this information, a replacement ratio (RR) may be calculated by plotting a graph with settling rate on the Y-axis and dose on the X-axis for each product tested. The dosage required to produce the desired plant settling rate is determined from the above graph. The replacement ratio is the dose of new polymer divided by the dose of conventional treatment needed to obtain the plant settling rate. If the RR value is below one, the experimental polymer is superior, if it is one, it is equivalent, and if it is above one it is poorer in activity relative to the conventional treatment polymer.

For all settling test, the Conventional Treatment Polymer A (CTP A, a co-polymer of methyl acrylate/acrylic acid, available from Nalco Chemical Company, Naperville, Ill.) is hydrolyzed as 1% emulsion in a 10 g/L NaOH solution at 80–85 C. for the optimum period of time (typically, 20–30 min) then diluted in de-ionized water to 0.1–0.2 weight percent (based on emulsion). Representative emulsion polymers 1–4 are hydrolyzed at 80–85° C. in a 10 g/L NaOH solution at 1.0–1.5% for 30 minutes, then further diluted, with de-ionized water to 0.2 weight percent (based on emulsion). The Conventional Treatment Polymer B (CTP B, poly(ammonium acrylate), available from Nalco Chemical Company, Naperville, Ill.) is inverted as a 1% emulsion in a 10 g/L NaOH solution, then diluted, with de-ionized water to 0.05–0.1 weight percent (based on emulsion). Representative inverse emulsion polymers 5–18 are inverted as a 1.0 or a 2.0% emulsion in a 10 g/L NaOH solution, then diluted, with de-ionized water to 0.1–0.2 weight percent (based on emulsion).

The clarity of the settler overflow is determined in a sample of the liquor taken from the top of the 1000 mL graduated cylinder after a specific time after settling, (e.g., typically 10 min, or 30 min). The overflow solids may be determined gravimetrically by filtering a specific volume of liquor, washing the solids with hot water and drying the solids in an oven at 100° C. for 2–4 hours. Alternatively, the turbidity of the overflow liquor is considered to be an indirect measure of the overflow solids. The turbidity (as NTU) is determined using a Hach Co. turbidimeter. If the turbidity of the overflow sample is over the range of the meter, then all the samples may be diluted to a specific volume using a hot 30 wt. % NaOH solution (e.g., 5 mL of overflow combined with 10 mL of 30 wt. % NaOH solution).

A clarity ratio is evaluated as a measure of the performance of the new polymer compared to conventional polymers. This is determined as the ratio of the overflow turbidity (or residual solids) using the new polymer divided by the turbidity (or residual solids) of the overflow for the conventional flocculant at the same specific settling rate (i.e., the plant settling rate).

Laboratory settling tests are performed at 95–100° C. on a variety of red mud slurries using the standard method described above. An aliquot (100 mL) of liquor is removed via syringe from the top of the cylinder after a specific time after settling, (e.g., typically 10 min, or 30 min). The filtration rate of this aliquot through a pre-weighed filter paper is measured in seconds. A vacuum pump with a control gauge is used to maintain a constant vacuum for/ during all tests. The timer is started immediately upon pouring the liquor on the filter paper, and then stopped at the first sign of dry surfaces on the filter. The overflow clarity of the aliquot is also determined gravimetrically (mg/L) after washing and drying the filter paper. To assess clarity and filtration times appropriate doses of each flocculent are used such that approximately the same settling rates for all cylinders is obtained.

Filtration times can be effectively compared for different polymers which produce approximately the same settling rate. A shorter filtration time value means that the flocculant is aiding filtration more efficiently. Residual flocculent (both synthetic and natural red mud flocculants) in the supernatant liquor have been shown to severely reduce filtration rate in the secondary clarification stage.

A filtration ratio is determined by dividing the filtration time of the experimental polymer by the filtration time of the CTP.

Tests are performed on a variety of red mud slurries using different Jamaican bauxite ores. The results of the foregoing tests for representative polymers of this invention are shown in Tables 4–11, below.

In Tables 4–11:

Mud Slurry A is a Jamaican bauxite ore slurry with total soda=245 g/L as $Na_2CO_3$ and 45.7 g/L solids;

Mud Slurry B is a Jamaican bauxite ore slurry with total soda=270 g/L as $Na_2CO_3$ and 56.8 g/L solids;

Mud Slurry C is a Jamaican bauxite ore slurry with total soda=235 g/L as $Na_2CO_3$ and 52.4 g/L solids;

Mud Slurry D is a Jamaican bauxite ore slurry with total soda=305 g/L as $Na_2CO_3$ and 32.9 g/L solids;

Mud Slurry E is a Jamaican bauxite ore slurry with total soda=248 g/L as $Na_2CO_3$ and 28.5 g/L solids;

Mud Slurry F is a Jamaican bauxite ore slurry with total soda=300 g/L as $Na_2CO_3$ and 39.5 g/L solids; and Mud Slurry G is a Jamaican bauxite ore slurry with total soda=304 g/L as $Na_2CO_3$ and 33.6 g/L solids.

TABLE 4

Settling and Clarity Performance of Representative Salicylic Acid Containing Flocculants versus Conventional Treatment Polymer A (CTP A)

| Mud Slurry | Polymer | Polymer Dose (ppm) | Settling Rate (ft/hr) | Clarity @ 10 min (NTU) | Clarity @ 10 min (mg/L) | Filtration Time (sec) |
|---|---|---|---|---|---|---|
| A | 1 | 3.5 | 4.4 | 187 | 46 | 7.1 |
|   |   | 5.7 | 19.5 | 123 | 72 | 20.3 |
| A | CTP A | 2.4 | 6.5 | 258 | 145 | 11.75 |
|   |   | 3.8 | 19.9 | 292 | 162 | 40.0 |
| B | 1 | 4.4 | 3.6 | 120 | 60 | 6.5 |
|   |   | 5.5 | 10.8 | 143 | 82 | 13.0 |
|   |   | 7.2 | 20.9 | 144 | 75 | 38.1 |
| B | 2 | 4.4 | 4.1 | 139 | 69 | 15.0 |
|   |   | 7.2 | 8.9 | 122 | 75 | 23.0 |
|   |   | 9.9 | 15.7 | 158 | 91 | 51.5 |
| B | CTP A | 3.1 | 3.9 | 229 | 110 | 6.0 |
|   |   | 4.1 | 22.5 | 400 | 176 | 42.8 |
|   |   | 5.0 | 41 | 302 | 139 | 40.2 |
| C | 3 | 38 | 2 | 116 |   |   |
|   |   | 48 | 2.2 | 145 |   |   |
| C | 4 | 2.4 | 4.4 | 204 |   |   |
|   |   | 3.0 | 15.2 | 207 |   |   |
|   |   | 3.6 | 21.7 | 245 |   |   |
|   |   | 4.8 | 26.8 | 232 |   |   |
| C | CTP A | 2.6 | 16.7 | 318 |   |   |
|   |   | 3.2 | 36.0 | 263 |   |   |
|   |   | 3.8 | 33 | 285 |   |   |
|   |   | 5.1 | 31.5 | 336 |   |   |

As shown in Table 4, representative salicylic acid containing emulsion polymers give comparable settling rates to those of the conventional treatment, as evidenced by a replacement ratio of about 1.6 to 2.4 (based on polymer actives).

The relative performance of the polymers of this invention compared to CTP A is shown in Table 5.

TABLE 5

Average Settling, Clarity and Filtration Performance of Representative Salicylic Acid Containing Flocculants versus Conventional Treatment Polymer A (CTP A)

| Polymer | Polymer Replacement Ratio, (Actives) | Clarity Ratio (by NTU) | Clarity Ratio (by mg/L solids) | Filtration Ratio |
|---|---|---|---|---|
| 1 | 1.6 | 0.44 | 0.51 | 0.65 |
| 2 | 2.4 | 0.45 | 0.55 | 0.90 |
| 3 | >5.0 | 0.43 | — | — |
| 4 | 1.6 | 0.74 | — | — |

As shown in Table 5, the polymers of this invention afford a 25–55% improvement in the overflow clarity as evidenced by clarity ratios of about 0.75 to 0.45 respectively. The polymers also improve the filterability of the overflow liquor by about 10 to 35%.

TABLE 6

Settling and Clarity Performance of Representative Salicylic Acid Containing Flocculants versus Conventional Treatment Polymer B for Mud Slurry D

| Polymer | Polymer Dose (ppm) | Settling Rate (ft/hr) | Clarity @ 10 min (NTU) |
|---|---|---|---|
| 14 | 3.7 | 8 | 178 |
|   | 5.6 | 9 | 185 |
|   | 7.4 | 21 | 280 |
|   | 9.3 | 39 | 194 |
| 15 | 3.8 | 3 | 176 |
|   | 5.7 | 10 | 211 |
|   | 7.6 | 26 | 210 |
| 8 | 3.7 | 7 | 229 |
|   | 5.5 | 16 | 263 |
|   | 7.4 | 44 | 243 |
| 9 | 3.8 | 7 | 180 |
|   | 5.7 | 8 | 198 |
|   | 7.6 | 22 | 231 |
|   | 9.6 | 26 | 217 |
| CTP B | 1.9 | 5 | 367 |
|   | 2.6 | 16 | 397 |
|   | 2.9 | 22 | 465 |
|   | 3.2 | 32 | 433 |
|   | 3.2 | 38 | 480 |

TABLE 7

Settling and Clarity Performance of Representative Salicylic Acid Containing Flocculants versus Conventional Treatment Polymer B for Mud Slurry E

| Polymer | Polymer Dose (ppm) | Settling Rate (ft/hr) | Clarity @ 10 min (NTU) | Average Clarity (NTU) | Clarity Ratio |
|---|---|---|---|---|---|
| 17 | 1.5 | 12 | 464 |   |   |
|   | 2.9 | 32 | 305 |   |   |
|   | 5.8 | 76 | 235 | 335 | 0.55 |
| 12 | 1.2 | 9 | 616 |   |   |
|   | 1.6 | 16 | 461 |   |   |
|   | 2.0 | 26 | 371 |   |   |
|   | 4.1 | 63 | 246 | 424 | 0.68 |
| CTP B | 0.8 | 9.8 | 918 |   |   |
|   | 1.0 | 14.1 | 725 |   |   |
|   | 1.3 | 27 | 500 |   |   |
|   | 2.5 | 80.7 | 346 | 622 | 1.0* |

*by definition.

TABLE 8

Settling and Clarity Performance of Representative Salicylic Acid Containing Flocculants versus Conventional Treatment Polymer B for Mud Slurry F

| Polymer | Polymer Dose (ppm) | Settling Rate (ft/hr) | Clarity @ 10 min (NTU) | Average Clarity (mg/L) | Filtration time (sec) |
|---|---|---|---|---|---|
| 15 | 7.9 | 7.7 | 136 | 39 | 33 |
|  | 11.9 | 14 | 155 | 50 | 56 |
|  | 13.9 | 16 | 139 | 46 | 50 |
| 8 | 5 | 4.9 | 151 | 43 | 18.5 |
|  | 6.7 | 13.8 | 180 | 76 | 43 |
|  | 10 | 21.2 | 177 | 61 | 54 |
| CTP B | 1.6 | 4.1 | 327 | 145 | 50.5 |
|  | 2.4 | 12 | 287 |  |  |
|  | 3.2 | 28.5 | 299 | 105 | 43 |
|  | 4.8 | 54.2 | 260 | 93 | 47 |

TABLE 9

Settling and Clarity Performance of Representative Salicylic Acid Containing Flocculants versus Conventional Treatment Polymer B for Mud Slurry G

| Polymer | p.NaAA/4-MASA mole % | Polymer Dose (ppm) | Settling Rate (ft/hr) | Clarity @ 10 min (NTU) | Average Clarity (NTU) | Clarity Ratio |
|---|---|---|---|---|---|---|
| 6 | 98.5/1.5 | 4.8 | 7 | 304 |  |  |
|  |  | 6.4 | 15 | 313 |  |  |
|  |  | 9.6 | 19 | 382 |  |  |
|  |  | 12.8 | 32 | 360 | 340 | 0.71 |
| 8 | 96.5/3.5 | 6 | 11 | 285 |  |  |
|  |  | 8 | 17 | 285 |  |  |
|  |  | 10 | 22 | 352 |  |  |
|  |  | 12 | 21 | 302 | 306 | 0.64 |
| 14 | 93.8/6.2 | 6 | 6 | 188 |  |  |
|  |  | 8 | 15 | 222 |  |  |
|  |  | 10 | 21 | 228 |  |  |
|  |  | 12 | 22 | 223 | 215 | 0.45 |
| CTP B | — | 1.6 | 3 | 473 |  |  |
|  |  | 2.4 | 13 | 426 |  |  |
|  |  | 3.2 | 19 | 475 |  |  |
|  |  | 4.8 | 35 | 535 | 477 | 1.0 |

The relative performance of the inverse emulsion polymers of this invention compared to Conventional Treatment Polymer B is summarized in Table 10.

TABLE 10

Average Settling, Clarity and Filtration Performance of Representative Salicylic Acid Containing Flocculants versus Conventional Treatment Polymer B. Results from multiple tests are listed.

| Polymer | RR (actives) | Clarity Ratio |
|---|---|---|
| 5 | 1.7 | 0.74 |
| 6 | 2.4 | 0.71 |
| 7 | 3–4.1 | 0.5, 0.7 |
| 8 | 2.1, 2.8, 2.7 | 0.57, 0.50, 0.64 |
| 9 | 2.6–3.0 | 0.48 |
| 10 | 2.4 | 0.73 |
| 11 | 1.7 | 0.80 |
| 12 | 1.9, 1.8 | 0.7 |
| 13 | 4.3 | 0.24 |
| 14 | 2.6, 2.8 | 0.50, 0.45 |
| 15 | 2.5, 4.7 | 0.46, 0.4 |
| 16 | 8.7 | 0.23 |
| 17 | 2.0, 2.6 | 0.5, 0.4 |

As shown in Tables 6–10, representative salicylic acid containing polymers give good settling rate results relative to a conventional treatment, as evidenced by replacement ratios (based on polymer actives) generally of about 1.6 to 5. In some cases, the replacement ratio is higher than 4, for example from about 5 to 9. This can be explained in part by the significantly lower RSV for the new polymer relative to the conventional treatment polymer. In general, the replacement ratios for the inverse emulsion polymers of this invention are higher than those of the emulsion polymers of this invention, because on average they have lower polymer RSV.

The new inverse emulsion polymers afford significant improvements from about 10 to 75% in the overflow clarity relative to the conventional treatments as evidenced by clarity ratios of about 0.75 to 0.25, respectively. The improvement in overflow clarity is affected by the mole ratio of salicylic acid goups present in the polymer, for example compare the results in Table 9, above. Increasing the amount of salicylic acid groups in the copolymer increased the clarification performance of the resulting polymer relative to the poly(acrylic acid) homopolymer.

The polymers of this invention also improve the filterability of the overflow liquor by about 10 to 35%. Filterability data for a representative polymer is shown in Table 11.

TABLE 11

Filterability Data for a Representative Salicylic Acid Containing Polymer Flocculant versus Conventional Treatment Polymer B

| Polymer | Polymer Dose (ppm) | Plunges | Settling Rate (ft/hr) | Clarity @ 10 min. (NTU) | Suspended Solids (mg/L) | Filtration time (sec) |
|---|---|---|---|---|---|---|
| CTP B | 3.34 | 5 | 10 | 408 | 147 | 118 |
|  | 3.34 | 25 | 10.7 | 413 | 182 | 57.5 |
|  | 5.01 | 15 | 23.6 | 496 | 170 | 94.5 |
|  | 6.68 | 25 | 50.2 | 366 | 142 | 142 |
| 14 | 10.66 | 5 | 5.2 | 205 | 66 | 52 |
|  | 10.66 | 25 | 3.3 | 106 | 87 | 25.1 |
|  | 15.99 | 15 | 9.83 | 146 | 39 | 45.5 |
|  | 21.32 | 25 | 19.9 | 141 | 35 | 87 |

Statistical analysis of the foregoing data shows (at a 95% confidence level): a 38% decrease in the overflow turbidity; a 42% decrease in overflow solids; and a 6% faster filtration time for polymer 14 vs. CTP B.

Settling and clarity performance of representative polymers of this invention in combination with conventional treatment polymers is shown in Tables 12–14.

TABLE 12

Combination Treatment of Representative Salicylic Acid Containing Polymer Flocculants versus Conventional Treatment Polymer B.

| Polymer/Polymer (Application) | Polymer Dose (ppm/ppm) | Total Dose (ppm) | Settling Rate (ft/hr) | Clarity @ 10 min (NTU) | Average Clarity (NTU) | Clarity Ratio |
|---|---|---|---|---|---|---|
| 18 then CTP B | 1.5/1.6 | 3.1 | 4 | 221 |  |  |
|  | 3.0/3.2 | 6.2 | 33 | 200 |  |  |
|  | 4.5/1.9 | 6.4 | 33 | 161 | 194 | 0.6 |
| 18 with CTP B | 1.6/1.6 | 3.2 | 12 | 237 |  |  |
|  | 3.1/3.2 | 6.3 | 77 | 249 | 243 | 0.8 |
| 16 then CTP B | 2.9/1.3 | 4.2 | 14 | 191 |  |  |
|  | 5.4/2.4 | 7.8 | 57 | 165 |  |  |
|  | 10.8/1.3 | 12.1 | 23 | 152 | 169 | 0.5 |

TABLE 12-continued

Combination Treatment of Representative Salicylic Acid Containing Polymer Flocculants versus Conventional Treatment Polymer B.

| Polymer/ Polymer (Application) | Polymer Dose (ppm/ ppm) | Total Dose (ppm) | Settling Rate (ft/hr) | Clarity @ 10 min (NTU) | Average Clarity (NTU) | Clarity Ratio |
|---|---|---|---|---|---|---|
| 16 with CTP B | 2.9/1.3 | 4.2 | 12 | 220 | | |
| | 5.0/2.2 | 7.3 | 30 | 206 | | |
| | 5.4/2.4 | 7.8 | 49 | 208 | 211 | 0.7 |
| CTP B then CTP B | 1.0/1.0 | 2.0 | 10.7 | 330 | | |
| | 1.1/1.1 | 2.2 | 20.7 | 390 | | |
| | 1.6/1.6 | 3.2 | 27.6 | 295 | | |
| | 2.4/2.4 | 4.8 | 74.3 | 265 | 320 | 1.0* |

*by definition.

TABLE 13

Combination Treatment of Representative poly(sodium acrylate/sodium 4-methacrylamidosalicylic acid) Flocculants versus Conventional Treatment Polymer B

| Polymer | Actives Dose (ppm) | Settling Rate (ft/hr) | Overflow Clarity (NTU) | Suspended Solids (mg/L) | Filtration Time (sec) |
|---|---|---|---|---|---|
| CTP B alone | 1.31 | 28.5 | 4732 | 1610 | 124 |
| | 1.97 | 75.2 | 2964 | 980 | 95 |
| | 1.64 | 44.0 | 4924 | 1703 | 120 |
| | 1.64 | 59.1 | 3751 | 1138 | 92 |
| 14 alone | 3.3 | 43.7 | 1212 | 483 | 58 |
| | 4.4 | 59.1 | 1107 | 508 | 83 |
| | 2.2 | 29.5 | 1959 | 765 | 49 |
| | 5.5 | 54.0 | 1065 | 438 | 94 |
| 17 alone | 3.3 | 37.6 | 1491 | 643 | 75 |
| | 3.3 | 35.9 | 930 | 563 | 46 |
| | 1.9 | 31.2 | 2355 | 815 | 35 |
| | 2.7 | 47.8 | 1575 | 545 | 41 |
| | 3.8 | 55.1 | 1329 | 613 | 49 |
| 17 with CTP B | 2.9 | 61.2 | 2031 | 735 | 62 |
| | 2.3 | 63.6 | 2673 | 868 | 72 |
| | 1.7 | 37.8 | 3241 | 1075 | 83 |
| 17 then CTP B | 2.8 | 61.2 | 1968 | 765 | 64 |
| | 4.1 | 52.5 | 1413 | 528 | 51 |
| | 4.9 | 47.2 | 1131 | 420 | 44 |
| CTP B then 17 | 2.6 | 37.6 | 2514 | 715 | 67 |
| | 3.3 | 92.9 | 2295 | 813 | 105 |
| | 4.9 | 41.8 | 1446 | 483 | 59 |

As shown in Tables 12 and 13, when a salicylic acid containing polymer with RSV of 14–21 dL/g is applied first to the mud slurry followed by the addition of a small amount of a high molecular weight poly(methyl acrylate/acrylic acid) or poly(ammonium acrylate) polymer having a RSV of >31–49 dL/g, overflow clarities can be improved by 40 to 70% over the conventional treatment alone. Furthermore, adding the low molecular weight polymer before the high molecular weight polymer is more effective at reducing the amount of residual overflow solids during clarification of the feed solids than multiple additions of a pre-blended mixture of the two polymers.

TABLE 14

Average Settling, Clarity, and Filtration Rate Performance of Representative Salicylic Acid Containing Polymers versus Conventional Treatment Polymer A

| Polymer | Replacement Ratio | Average Clarity (NTU) | Clarity Ratio (by NTU) | Suspended Solids (mg/L) | Clarity Ratio (by mg/L solids) | Average Filtration Time (sec) |
|---|---|---|---|---|---|---|
| CTP B alone | 1.0 | 4093 | 1.0 | 1360 | 1.0 | 108 |
| 14 alone | 3.5 | 1336 | 0.33 | 570 | 0.42 | 68 |
| 17 alone | 2.6 | 1753 | 0.43 | 660 | 0.48 | 42 |
| 17 with CTP B | 1.7 | 2648 | 0.65 | 890 | 0.66 | 72 |
| 17 then CTP B | | 1504 | 0.37 | 570 | 0.42 | 53 |
| CTP B then 17 | | 2085 | 0.51 | 670 | 0.49 | 77 |

As shown in Table 14, improved clarity is also obtained using combinations of the low and high molecular weight polymers containing pendant salicylic acid groups. Tests with addition of only the low molecular weight polymers of this invention (i.e., RSV <20 dL/g) do not give adequate mud settling rates in the desired range of 10–50 ft/hr.

Table 14 further shows that upon comparison to conventional treatment Polymer B, the polymers of this invention improve filtration rates on average. Better clarity, lower NTU or lower suspended solids are preferred as the resulting liquor will effectively allow a refinery to filter a larger amount of liquor before regenerating the filter aid.

As a note, in the absence of any polymer treatment, mud settling rates would be less than 1 ft/hr and clarity would be >4000 NTU for reference to Tables 3 to 13.

The polymers of this invention, alone and in combination with starch and/or dextran effectively clarify Bayer process red mud thickener feed. The data is shown in Table 15. The data marked reduction in residual overflow solids and improved filtration rate relative to a conventional polymer treatment.

TABLE 15

Settling and Clarity Performance of Representative Salicylic Acid Containing Polymers versus Conventional Treatment Polymer B on Bayer Process Red Mud Thickener Feed

| Polymer | Dose g/ton | Settling rate m/hr | Residual Overflow Solids g/L | % Improvement | Filtration Rate L/min | % Improvement |
|---|---|---|---|---|---|---|
| CTP | 125 | 11.9 | 0.321 | | 0.55 | — |
| 14 | 250 | 15.6 | 0.160 | 50 | 0.67 | 22 |
| 14 and Starch | 250 1000 | 13.2 | 0.145 | 55 | 0.80 | 45 |
| 14 and Dextran | 250 500 | 14.7 | 0.066 | 79 | 1.20 | 118 |
| 14 and Starch and Dextran | 250 1000 500 | 11.9 | 0.057 | 82 | 0.86 | 56 |
| 14 and 12 | 250 500 | 27.8 | 0.05 | 84 | 0.11 | |

The polymers of this invention are also effective in removing precipitated alumina (bright hydrate) solids from Bayer process liquors. The data for a representative poly (sodium acrylate/sodium 4-methacrylamidosalicylic acid) polymer of this invention is shown in Tables 16 and 17. In Tables 16 and 17, CTP C is dextran.

TABLE 16

Settling and Clarity Performance of Representative Salicylic Acid Containing Polymers versus Conventional Treatment Polymer C on Bayer Process Liquors containing Precipitated Alumina Solids

| Polymer | Dose, g/ton | Settling rate, m/hr | Overflow solids, g/L |
|---|---|---|---|
| None | | 0.6 | 4.8 |
| CTP C | 100 | 1.4 | 4.5 |
| 12 | 200 | 1.7 | 2.5 |
| 12 | 400 | 1.9 | 2.3 |
| 12 | 600 | 2.3 | 1.9 |

As shown in Table 16, the polymers of this invention provide about 40–55 percent lower overflow solids in the liquor compared to the conventional treatment program.

TABLE 17

Settling and Clarity Performance of Representative Salicylic Acid Containing Polymers versus Conventional Treatment Polymer C in Bayer Process Secondary Hydrate Thickeners

| Polymer | Dose, g/ton | Settling rate, m/hr | Overflow solids, g/L | Underflow density, g/L |
|---|---|---|---|---|
| None | | 1.0 | 4.9 | 800 |
| CTP C | 83 | 3.5 | 1.1 | 800 |
| CTP C | 167 | 4.0 | 0.70 | 800 |
| 12 | 83 | 2.1 | 1.8 | 1000 |
| 12 | 167 | 2.5 | 1.5 | 1000 |
| 12 | 333 | 2.7 | 1.4 | 960 |

As shown in Table 17, the polymers of this invention provide overflow clarities similar to the conventional treatment program and significantly improved underflow densities.

The settling and clarity performance of representative polymers of this invention incorporating salicylic acid groups in the polymer backbone are summarized in Table 18. In Table 18, polymer 19 is salicylic acid/formaldehyde copolymer prepared as described in Example 14. Polymer 20 is salicylic acid/resorcinol/formaldehyde polymer prepared according to the method of Example 15.

TABLE 18

Settling and Clarity Performance of Representative Salicylic Acid Containing Flocculants versus Conventional Treatment Polymer B (CTP B)

| Polymer | Polymer dose (mg/L) | Settling Rate (ft/hr) | Overflow Clarity (NTU) |
|---|---|---|---|
| CTP B | 7 | 5.4 | >1000 |
| | 10 | 34 | 382 |
| | 12 | 84 | 235 |
| 19/CTP B | 50/7 | 6.1 | 791 |
| | 50/10 | 27 | 393 |
| | 50/12 | 82 | 212 |
| 19 | 250 | 2.7 | 928 |
| | 500 | 5.2 | 788 |
| 20/CTP B | 100/2 | 29 | 416 |
| | 100/2 | 54 | 271 |
| | 100/2.5 | 80 | 162 |

As shown in Table 18, polymers incorporating salicylic acid groups in the polymer backbone have utility as red-mud flocculants.

It is understood that mixtures of polymers of this invention, or mixtures of one or more polymers of this invention with conventional treatment polymer(s) (for example, polysaccharides, acrylate homopolymers, copolymers and or terpolymers with acrylamide, hydroxamic acid groups, AMPS, etc ) or reagents are contemplated as falling within the scope of this invention.

Changes can be made in the composition, operation and arrangement of the method of the present invention described herein without departing from the concept and scope of the invention as defined in the following claims:

We claim:

1. A method of flocculating suspended solids in a Bayer process liquor comprising adding to the liquor an effective amount of a polymer comprising pendant salicylic acid groups, the polymer prepared by free radical polymerization of one or more acrylate monomers selected from the group consisting of methyl acrylate and acrylic acid and one or more salicylic acid containing monomers selected from the group consisting of 4-methacrylamidosalicylic acid, 4-methacrylamidosalicylic acid phenyl ester, O-acetyl4-methacrylamidosalicylic acid and O-acetyl-4-methacrylamidosalicylic acid phenyl ester.

2. The method of claim 1 wherein the polymer is selected from the group consisting of emulsion polymers and inverse emulsion polymers.

3. The method of claim 2 wherein the polymer comprises from about 80 to about 99 mole percent sodium or ammonium acrylate and from about 1 to about 20 mole percent 4-methacrylamidosalicylic acid, 4-methacrylamidosalicylic acid phenyl ester, O-acetyl-4-methacrylamidosalicylic acid or O-acetyl-4-methacrylamidosalicylic acid phenyl ester.

4. The method of claim 2 wherein the polymer comprises from about 88 to about 98 mole percent methyl acrylate, from about 1 to about 6 mole percent sodium acrylate and from about 1 to about 6 mole percent 4-methacrylamidosalicylic acid, 4-methacrylamidosalicylic acid phenyl ester, O-acetyl-4-methacrylamidosalicylic acid or O-acetyl-4-methacrylamidosalicylic acid phenyl ester.

5. The method of claim 1 further comprising hydrolyzing the polymer prior to addition to the Bayer process liquor.

6. The method of claim 5, fiber comprising adding one or more anionic or nonionic flocculant(s) to the process stream.

7. The method of claim 6 wherein the nonionic flocculant is starch, dextran or flour.

8. The method of claim 6 wherein the anionic flocculant comprises poly (meth)acrylic acid.

9. The method of claim 8 wherein the poly (meth)acrylic acid is selected from the group consisting of poly(meth)acrylic acid, poly(meth)acrylic acid containing pendant hydroxamic acid groups, poly (alkyl (meth)acrylate), (meth)acrylic acid/alkyl (meth)acrylate copolymers, (meth)acrylic acid/acrylamide copolymers, (meth)acrylic acid/acrylamide copolymers containing pendant hydroxamic acid groups, (meth)acrylic acid/acrylamide/alkyl (meth)acrylate terpolymers, and (meth)acrylic acid/acrylamide/AMPS terpolymers.

10. The method of claim 8 wherein the salicylic acid containing polymer has an RSV of from about 14 to about 21 dL/g and the anionic flocculant has an RSV greater than about 31 dL/g.

11. The method of claim 6 wherein the anionic flocculant is added prior to the salicylic acid containing polymer.

12. The method of claim 6 wherein the anionic flocculant is added after the salicylic acid containing polymer.

13. The method of claim 6 wherein the anionic flocculant is added together with the salicylic acid containing polymer.

14. The method of claim 1 wherein the Bayer process liquor is selected from settler feed, settler overflow, digestion blow-off, mud washer in the washer train, feed to the primary polishing filters, feed to a mud settler, feed to the primary alumina crystallization tanks, feed to the secondary and tertiary alumina classifers or trays, feed to hydrate filters or feed to a centrifuge.

15. A method of flocculating suspended solids in a Bayer process liquor comprising adding to the liquor an effective amount of a polymer comprising backbone salicylic acid groups, the polymer selected from the group consisting of salicylic acid-formaldehyde copolymer and condensation polymers of salicylic acid, formaldehyde and one or more active hydrogen compounds selected from the group consisting of amides, ureas, amines and aromatic compounds.

* * * * *